United States Patent
Chang

(10) Patent No.: US 8,248,576 B2
(45) Date of Patent: Aug. 21, 2012

(54) DOUBLE-LAYER LIQUID CRYSTAL LENS APPARATUS

(75) Inventor: Chi-Lone Chang, Hsinchu County (TW)

(73) Assignee: Silicon Touch Technology Inc., Hsinchu (TW)

( * ) Notice: Subject to any disclaimer, the term of this patent is extended or adjusted under 35 U.S.C. 154(b) by 170 days.

(21) Appl. No.: 12/899,558

(22) Filed: Oct. 7, 2010

(65) Prior Publication Data
US 2011/0234934 A1    Sep. 29, 2011

(30) Foreign Application Priority Data
Mar. 26, 2010    (TW) .............................. 99109060 A

(51) Int. Cl.
*G02F 1/13*    (2006.01)
(52) U.S. Cl. ......................................................... 349/200
(58) Field of Classification Search .................... 349/200
See application file for complete search history.

(56) References Cited

U.S. PATENT DOCUMENTS

| | | | |
|---|---|---|---|
| 4,066,334 A | 1/1978 | Fray et al. | |
| 6,577,376 B1 | 6/2003 | Shih | |
| 6,690,500 B2 | 2/2004 | Ogasawara et al. | |
| 6,859,333 B1 | 2/2005 | Ren et al. | |
| 6,864,951 B1 | 3/2005 | Ren et al. | |
| 7,262,820 B2 | 8/2007 | Ogasawara | |
| 7,567,337 B2 * | 7/2009 | Horiuchi et al. | 349/200 |
| 8,035,794 B2 * | 10/2011 | Ju et al. | 349/200 |

OTHER PUBLICATIONS

Ye et al., Liquid-crystal lens with a focal length that is variable in a wide range, Applied Optics, vol. 43, No. 35, pp. 6407-6412, Dec. 10, 2004.
Lin et al., Highly efficient and polarization-independent Fresnel lens based on dye-doped liquid crystal, Optics Express, vol. 15, No. 6, pp. 2900-2906, Mar. 19, 2007.

* cited by examiner

*Primary Examiner* — James Dudek
(74) *Attorney, Agent, or Firm* — Jianq Chyun IP Office

(57) ABSTRACT

A double-layer liquid crystal lens apparatus having two liquid lens structures is provided. A driving voltage of each liquid crystal lens structure is controlled by an active device disposed thereon. When an incident light is passing through the liquid crystal lens structures, the optical path difference of the incident light is compensated by the liquid crystal lens structures, so that the double-layer liquid crystal lens apparatus performs the focusing function well without using a polarizer. Applying a suitable driving voltage on each of the active devices, the double-layer liquid crystal lens apparatus has a function of modulating focal length focusing/diverging the light, like a convex lens or a concave lens.

20 Claims, 8 Drawing Sheets

DOUBLE-LAYER LIQUID CRYSTAL LENS APPARATUS

CROSS-REFERENCE TO RELATED APPLICATION

This application claims the priority benefit of Taiwan application serial no. 99109060, filed on Mar. 26, 2010. The entirety of the above-mentioned patent application is hereby incorporated by reference herein and made a part of this specification.

BACKGROUND OF THE INVENTION

1. Field of the Invention

The invention relates generally to a liquid crystal lens that is capable of adjusting a liquid crystal lens quality, being controlled by thin film transistors (TFTs), and having a high transmittance, and more particularly, to a double-layer liquid crystal lens apparatus.

2. Description of Related Art

Over the years, a number of publications have disclosed techniques relating to liquid crystal optical devices which employ liquid crystal materials having special optical characteristics with adjustable refractive indices when external voltages are applied thereto, so as to alter a focal length of a lens for applications in various fields. The concept of using liquid crystals to fabricate refractive optical devices is first disclosed in U.S. Pat. No. 4,066,334, which describes applying an external voltage to adjust a rotational direction of the liquid crystal molecules so as to vary a refractive index, and thereby causing an incident beam to be deflected in a liquid crystal material. Afterwards, there have been many publications which describe liquid crystal optical devices utilizing the adjustable characteristics of the liquid crystals. For example, in an electrode design according to U.S. Pat. No. 6,577,376 for driving liquid crystals, diffraction zone plates designed as concentric circles are used to form a diffractive liquid crystal device, so as to generate a first-order diffraction beam and a zero-order non-diffractive beam for an incident beam of a predetermined polarization direction. The device is complemented with a focusing lens to generate two focus points of different positions, for application in an optical pickup head to read/write multi-layered data, as well as for application in an aberration correction unit.

Moreover, in U.S. Pat. No. 6,690,500, the driving electrodes of a liquid crystal device are cyclic ring-shaped structures designed as concentric circles. Each of the ring-shaped electrodes is driven with different high and low voltages for continuous voltage drops, so that the refractive indices of the liquid crystal molecules when the electrodes are operating are continuously distributed. Accordingly, by phase adjusting the optical path differences to form structures such as a Fresnel lens, the device can be applied in the aberration correction of the optical pickup head focus points. Further, as disclosed in U.S. Pat. No. 7,262,820, an electrode design therein has two matching upper and lower semi-circular regions, for application in the aberration correction of the optical pickup head, and especially for correcting coma aberration due to tilt.

In addition, U.S. Pat. No. 6,864,951 describes combining the use of an inhomogeneous polymer dispersed liquid crystal (PDLC) combined with an ultraviolet (UV) light radiation, so that the liquid crystal molecules form droplets of uneven size, and an optical focusing property can be continuously modulated by changing an externally applied voltage. Further, as disclosed in an international scientific journal APPLIED OPTICS (Vol. 43, No. 35, p. 6407, December, 2004), the electrodes are configured on another side of a glass that is far thicker than a liquid crystal medium layer. By applying a substantially higher voltage, after an electric potential distributes and passes through the glass, the electric potential has a distribution of continuous curved surfaces, thereby resulting in a continuous liquid crystal refractive index distribution analogous to a lens having a continuous phase distribution, along with a superior focusing property and a simple device structure. However, a driving voltage required is as high as 100 V, far more than the driving voltage of about 5 V for a typical liquid crystal device.

The aforementioned conventional liquid crystal optical devices such as those disclosed by U.S. Pat. Nos. 6,577,376 and 6,690,500 adopt strip-shape or Fresnel lens diffractive device designs. However, due to the diffraction orders generated through diffraction, an overall usable efficiency of a light beam is lowered. On the other hand, because of the restrictive complexities in an UV light exposure process, for the disclosure of U.S. Pat. No. 6,864,951 adopting the PDLC structure, a plurality of restrictions are placed on the medium layer due to factors such as a low transmittance from dispersive effects and a high driving voltage requirement. Most importantly, because of a birefringence property of liquid crystals, the adjustable optical characteristic thereof is applicable only for incident beams of a predetermined polarization, and thus its range of applications is somewhat limited. The aforementioned conventional techniques are applicable only in optical systems using a laser light source or those including a polarizer and an analyzer, since these techniques cannot be effectively employed for imaging systems adopting a typical light source.

Moreover, as disclosed in U.S. Pat. No. 6,859,333, a liquid crystal lens adopting a double-layer liquid crystal layer structure attempts to solve an issue of polarization selectivity of the liquid crystal device. However, the disclosed invention adopts a spherical electrode substrate along with an evenly distributed liquid crystal medium, wherein an adjustable focal length is achieved by applying a voltage to drive the liquid crystals so as to compensate for a fixed curvature of the spherical electrode. The fabrication of the spherical electrode is a main difficulty for this disclosed invention. Furthermore, in a disclosure published in an international scientific journal OPTICS EXPRESS (Vol. 15, No. 6, p. 2900, March, 2007), a photo-alignment method is employed to realize a liquid crystal lens that is independent of light polarization directions. However, the liquid crystal lens has a complicated fabrication process, which remains an important factor to consider.

SUMMARY OF THE INVENTION

An aspect of the invention provides a double-layer liquid crystal lens apparatus having, a simple structure and capable of achieving a preferable optical focal length modulating function.

An aspect of the invention provides a double-layer liquid crystal lens apparatus including a first electrode device, a second electrode device, a third electrode device, and two liquid crystal layers. The first electrode device includes a first substrate, at least a first active device, a first electrode, and a first alignment layer. The first active device, the first electrode, and the first alignment layer are disposed on the first substrate. The first active device is electrically connected to the first electrode, and the first electrode has a first opening. The second electrode device includes a second substrate, at least a second active device, a second electrode, and a second alignment layer. The second active device, the second electrode, and the second alignment layer are disposed on the second substrate. The second active device is electrically connected to the second electrode, and the second electrode has a second opening corresponding to the first opening. The third electrode device is disposed between the first electrode device and the second electrode device. The third electrode device includes a third substrate, a common electrode, a third alignment layer, and a fourth alignment layer. The common electrode, the third alignment layer, and the fourth alignment layer are disposed on the third substrate. The third alignment layer and the fourth alignment layer are respectively disposed on different sides of the third substrate, whereas the common electrode is disposed between the third alignment layer and the third substrate. The two liquid crystal layers are respectively disposed between the first electrode device and the third electrode device, and between the second electrode device and the third electrode device. The first alignment layer and the third alignment layer align one of the liquid crystal layers, whereas the second alignment layer and the fourth alignment layer align another one of the liquid crystal layers.

According to an embodiment of the invention, the first active device includes a gate, an active layer, a source, and a drain. The drain is electrically connected to the first electrode, and when the gate is driven, the source and the drain are electrically connected to each other through the active layer. According to an embodiment of the invention, the second active device includes a gate, an active layer, a source, and a drain. The drain is electrically connected to the second electrode, and when the gate is driven, the source and the drain are electrically connected to each other through the active layer.

According to an embodiment of the invention, an electric potential of the first electrode and an electric potential of the second electrode are the same, whereas the electric potentials of the first electrode and the second electrode are different from an electric potential of the common electrode. According to another embodiment of the invention, the electric potential of the first electrode and is different from the electric potential of the second electrode, and the electric potentials of the first electrode and the second electrode are different from the electric potential of the common electrode.

According to another embodiment of the invention, when the at least a first active device and the at least a second active device are respectively a plurality of first active devices and a plurality of second active devices, the double-layer liquid crystal lens apparatus further includes at least a first ring-shaped electrode and at least a second ring-shaped electrode. The first ring-shaped electrode is disposed inside the first opening, and the first active devices are respectively electrically connected to the first electrode and the first ring-shaped electrode. The second ring-shaped electrode is disposed inside the second opening, and the second active devices are respectively electrically connected to the second electrode and the second ring-shaped electrode.

According to an embodiment of the invention, each of the first active devices includes a gate, an active layer, a source, and a drain. The drain of each of the first active devices is electrically connected to the first electrode and the first ring-shaped electrode, and when the gate is driven, the source and the drain are electrically connected to each other through the active layer.

According to an embodiment of the invention, each of the second active devices includes a gate, an active layer, a source, and a drain. The drain of each of the second active devices is electrically connected to the second electrode and the second ring-shaped electrode, and when the gate is driven, the source and the drain are electrically connected to each other through the active layer.

According to an embodiment of the invention, the at least a first ring-shaped electrode disposed inside the first opening is arranged as concentric circles, and the at least a second ring-shaped electrode disposed inside the second opening is arranged as concentric circles.

According to an embodiment of the invention, at least a portion of the electric potentials of the first electrode and the at least a first ring-shaped electrode is the same.

According to an embodiment of the invention, the electric potentials of the first electrode and the at least a first ring-shaped electrode are different.

According to an embodiment of the invention, at least a portion of the electric potentials of the second electrode and the at least a second ring-shaped electrode is the same.

According to an embodiment of the invention, the electric potentials of the second electrode and the at least a second ring-shaped electrode are different.

According to an embodiment of the invention, an alignment direction of the first alignment layer is parallel and opposite to an alignment direction of the third alignment layer, an alignment direction of the second alignment layer is parallel and opposite to an alignment direction of the fourth alignment layer, and the alignment direction of the first alignment layer is perpendicular to the alignment direction of the second alignment layer.

According to an embodiment of the invention, the first electrode is disposed on a side of the first substrate, whereas the first alignment layer is disposed on another side of the first substrate.

According to an embodiment of the invention, the first electrode and the first alignment layer are disposed on a same side of the first substrate, and the first electrode is disposed between the first alignment layer and the first substrate.

According to an embodiment of the invention, the second electrode is disposed on a side of the second substrate, whereas the second alignment layer is disposed on another side of the second substrate.

According to an embodiment of the invention, the second electrode and the second alignment layer are disposed on a same side of the second substrate, and the second electrode is disposed between the second alignment layer and the second substrate.

According to an embodiment of the invention, the first electrode device, the second electrode device, and the third electrode device share a same driving power source or respectively employs a different driving power source.

According to an embodiment of the invention, the double-layer liquid crystal lens apparatus further includes a plurality of sealants respectively disposed between the first electrode device and the third electrode device, and between the second electrode device and the third electrode device, so as to respectively maintain a first containing space between the first electrode device and the third electrode device, and maintain a second containing space between the second electrode device and the third electrode device, The liquid crystal layers are respectively disposed inside the first containing space and the second containing space.

In summary, by employing the first electrode device, the second electrode device, and the third electrode device to form a double-layer liquid crystal lens structure, and suitably controlling a voltage applied on the liquid crystal lens, the double-layer liquid crystal apparatus according to embodiments of the invention has a preferable focal length modulating ability and a condition of double focus points does not easily occur. Moreover, since the double-layer liquid crystal apparatus controls the refractive index of the double-layer liquid crystal lens by using active devices (e.g., TFTs), the overall size of the double-layer liquid crystal apparatus may be effectively reduced. Moreover, the use of external ICs is reduced, thereby lowering the fabrication cost and simplifying the structure.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
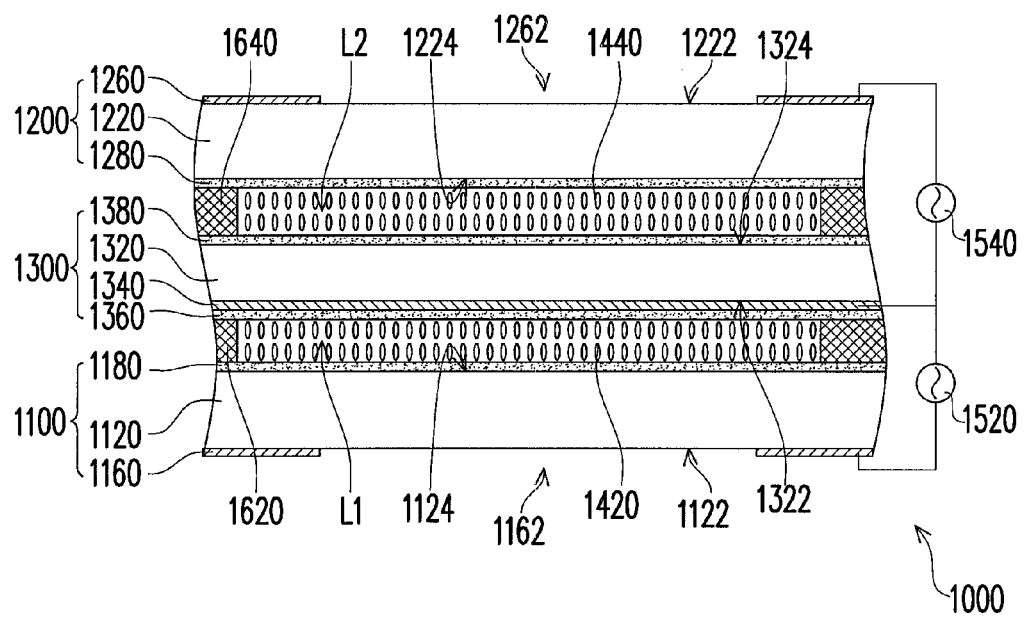
FIG. 1 is a schematic view illustrating a portion of a double-layer liquid crystal lens apparatus in accordance with an embodiment of the invention.
Figure 2A:
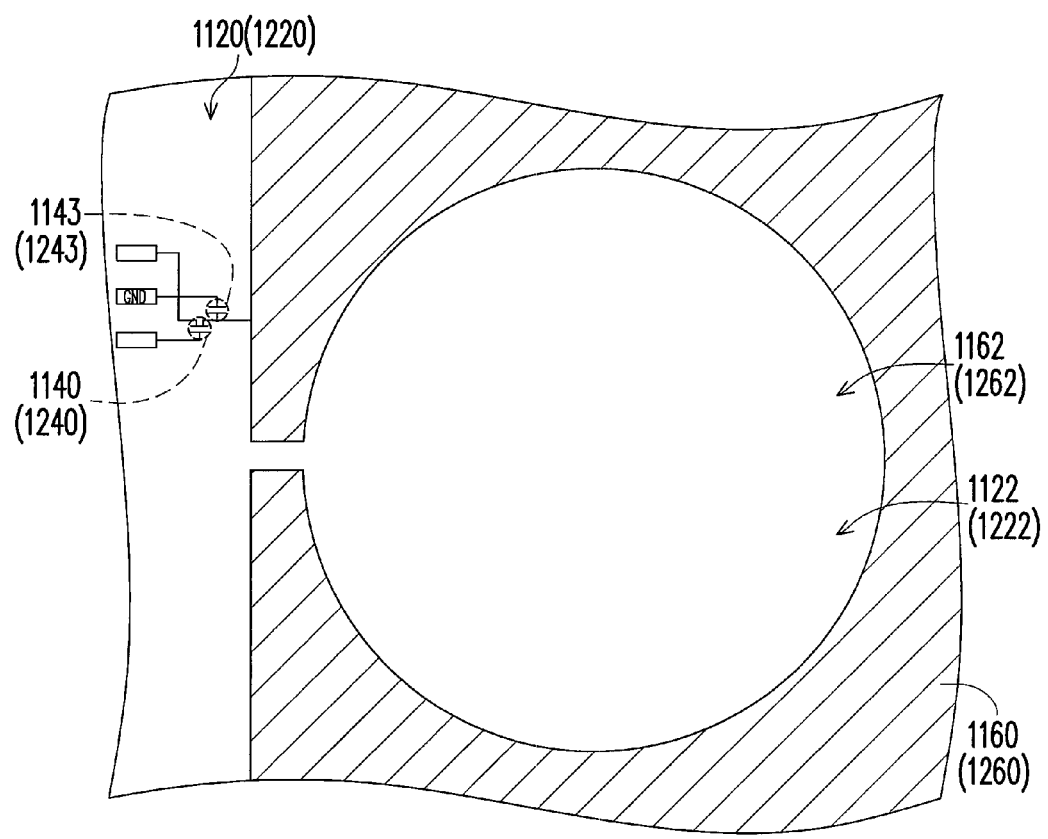
FIG. 2A is a schematic view illustrating a portion of a first active device and a first electrode disposed on a first substrate, or a portion of a second active device and a second electrode disposed on a second substrate depicted in FIG. 1.
Figure 2B:
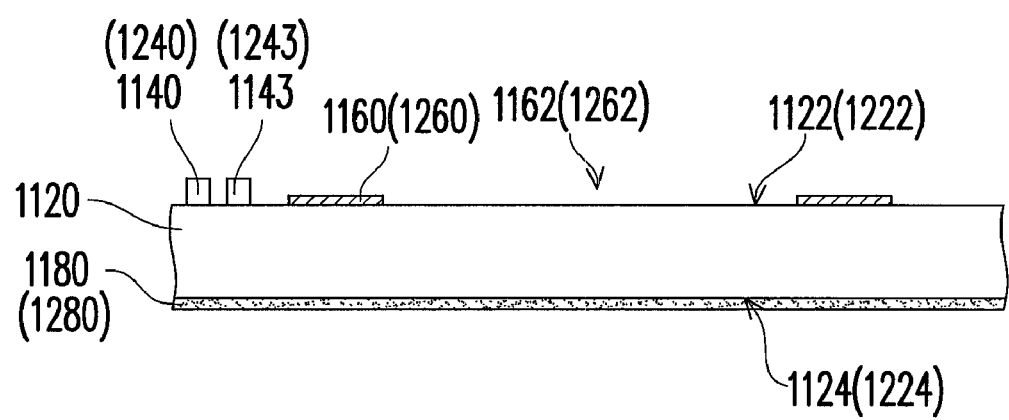
FIG. 2B is a schematic cross-sectional view illustrating a portion of a first electrode device or a second electrode device.
Figure 2C:
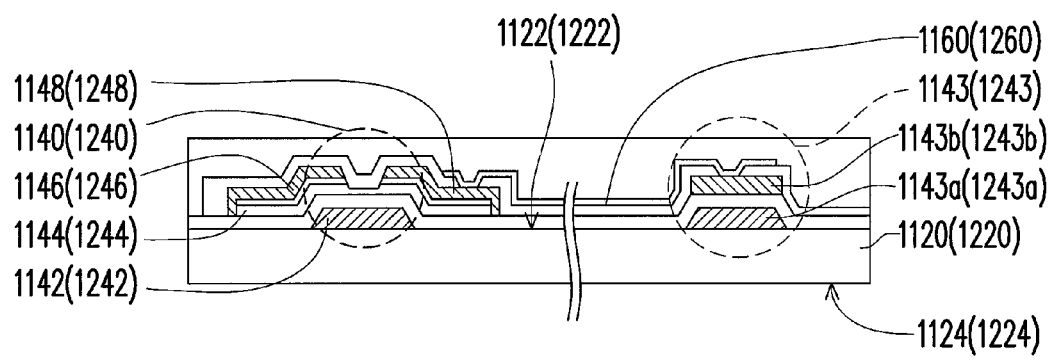
FIG. 2C is a schematic view illustrating a portion of the first active device on the first electrode device, or a portion of the second active device on the second electrode device.
Figure 2D:
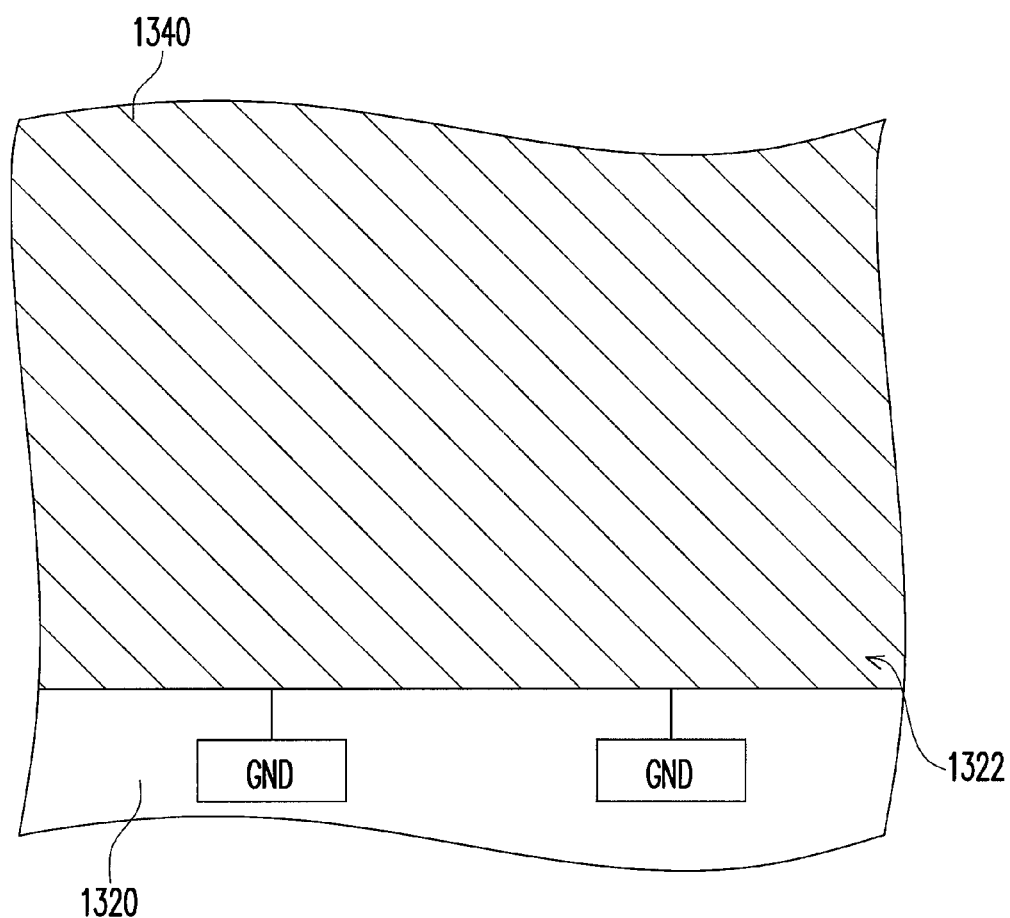
FIG. 2D is a schematic view illustrating a portion of a common electrode disposed on a third substrate.

FIG. 1 is a schematic view illustrating a portion of a double-layer liquid crystal lens apparatus in accordance with an embodiment of the invention. FIG. 2A is a schematic view illustrating a portion of a first active device and a first electrode disposed on a first substrate, or a portion of a second active device and a second electrode disposed on a second substrate depicted in FIG. 1. FIG. 2B is a schematic cross-sectional view illustrating a portion of a first electrode device or a second electrode device. FIG. 2C is a schematic view illustrating a portion of the first active device on the first electrode device, or a portion of the second active device on the second electrode device. FIG. 2D is a schematic view illustrating a portion of a common electrode disposed on a third substrate. Referring concurrently to FIGS. 1 and 2A-D, a double-layer liquid crystal lens 1000 according to the present embodiment includes a first electrode device 1100, a second electrode device 1200, a third electrode device 1300, and two liquid crystal layers 1420 and 1440.

The first electrode device 1100 includes a first substrate 1120, at least a first active device 1140, a first electrode 1160, and a first alignment layer 1180. The first active device 1140, the first electrode 1160, and the first alignment layer 1180 are disposed on the first substrate 1120. The first active device 1140 is electrically connected to the first electrode 1160, and the first electrode 1160 has a first opening 1162. In the present embodiment of the invention, the first substrate 1120 has a first surface 1122 and a second surface 1124. As shown in FIGS. 1, 2A, and 2B, the first active device 1140 and the first electrode 1160 are disposed on the first surface 1122 of the first substrate 1120, and the first alignment layer 1180 is disposed on the second surface 1124 of the first substrate 1120. In the present embodiment, the first opening 1162 is exemplarily circular to facilitate description, although embodiments of the invention are not limited thereto. In other embodiments of the invention, the first opening 1162 may be suitably adjusted according to an optical effect a user demands. Moreover, the first electrode 1160 may be transparent or opaque. The first electrode 1160 according to the present embodiment is exemplarily transparent to facilitate description, although not limited thereto.

More specifically, the first active device 1140 includes a gate 1142, an active layer 1144, a source 1146, and a drain 1148. The drain 1148 is electrically connected to the first electrode 1160. Moreover, when the gate 1142 is driven, the source 1146 and the drain 1148 are electrically connected to each other through the active layer 1144, so that a voltage signal from the source 1146 may be transmitted to the first electrode 1160 by passing through the active layer 1144 and the drain 1148 in sequence. In other words, the first active device 1140 is mainly used as a switch for the first electrode 1160, in which the first active device 1140 is a thin film transistor (TFT), for example.

In the present embodiment, the first electrode 1160 may also be electrically connected to a storage capacitor 1143, so that the storage capacitor 1143 may be charged and discharged. In the present embodiment, an electrode 1143a of the storage capacitor 1143 and the gate 1142 are disposed on a same layer, whereas another electrode 1143b of the storage capacitor 1143 and the source 1146 or the drain 1148 are disposed on a same layer.

Continuing reference to FIGS. 1 and 2A-2D, the second electrode device 1200 includes a second substrate 1220, at least a second active device 1240, a second electrode 1260, and a second alignment layer 1280. The second active device 1240, the second electrode 1260, and the second alignment layer 1280 are disposed on the second substrate 1220. The second active device 1240 is electrically connected to the second electrode 1260, and the second electrode 1260 has a second opening 1262 corresponding to the first opening 1162. In the present embodiment of the invention, the second substrate 1220 has a first surface 1222 and a second surface 1224. As shown in FIGS. 1, 2A, and 2B, the second active device 1240 and the second electrode 1260 are disposed on the first surface 1222 of the second substrate 1220, and the second alignment layer 1280 is disposed on the second surface 1224 of the second substrate 1220. In the present embodiment, the second opening 1262 is exemplarily circular to facilitate description, although embodiments of the invention are not limited thereto. In other embodiments of the invention, the second opening 1262 may be suitably adjusted according to the optical effect a user demands.

Likewise, the second active device 1240 includes a gate 1242, an active layer 1244, a source 1246, and a drain 1248. The drain 1248 is electrically connected to the second electrode 1260. Moreover, when the gate 1246 is driven, the source 1246 and the drain 1248 are electrically connected to each other through the active layer 1244, so that a voltage signal from the source 1246 may be transmitted to the second electrode 1260 by passing through the active layer 1244 and the drain 1148 in sequence. In other words, the second active device 1240 is mainly used as a switch for the second electrode 1260, in which the second active device 1240 is a TFT.

Moreover, the second electrode 1260 may also be electrically connected to a storage capacitor 1243, so that the storage capacitor 1243 may be charged and discharged. In the present embodiment, an electrode 1243a of the storage capacitor 1243 and the gate 1242 are disposed on a same layer, whereas another electrode 1243b of the storage capacitor 1243 and the source 1246 or the drain 1248 are disposed on a same layer.

Continuing reference to FIGS. 1 and 2A-2D, the third electrode device 1300 is disposed between the first electrode device 1100 and the second electrode device 1200. The third electrode device 1300 includes a third substrate 1320, a common electrode 1340, a third alignment layer 1360, and a fourth alignment layer 1380. The common electrode 1340, the third alignment layer 1360, and the fourth alignment layer 1380 are disposed on the third substrate 1320. The third alignment layer 1360 and the fourth alignment layer 1380 are respectively disposed on different sides of the third substrate 1320, whereas the common electrode 1340 is disposed between the third alignment layer 1360 and the third substrate 1320. In the present embodiment of the invention, the third substrate 1320 has a first surface 1322 and a second surface 1324. As shown in FIGS. 1 and 2C, the third alignment layer 1360 is disposed on the first surface 1322 of the third substrate 1320, and the fourth alignment layer 1380 is disposed on the second surface 1324 of the third substrate 1320. In the present embodiment, the electrodes 1143a and 1243a of the storage capacitors 1143 and 1243 may share an electric potential of the common electrode 1340. In other words, as shown in FIGS. 1, 2A, 2C, and 2D, by using the electric potential of the common electrode 1340 as a ground potential (GND), the voltage sources 1520 and 1540 may be respectively externally coupled to electrically connect to the first active device 1140 and the second active device 1240.

In the present embodiment, an alignment direction of the first alignment layer 1180 is parallel and opposite to an alignment direction of the third alignment layer 1360. An alignment direction of the second alignment layer 1280 is parallel and opposite to an alignment direction of the fourth alignment layer 1380, and the alignment direction of the first alignment layer 1180 is perpendicular to the alignment direction of the second alignment layer 1280.

Continuing reference to FIGS. 1 and 2A-2D, the liquid crystal layers 1420 and 1440 are respectively disposed between the first electrode device 1100 and the third electrode device 1300, and between the second electrode device 1200 and the third electrode device 1300. Moreover, since the liquid crystal layer 1420 is sandwiched between the first alignment layer 1180 and the third alignment layer 1360, and the alignment direction of the first alignment layer 1180 is parallel and opposite to the alignment direction of the third alignment layer 1360, therefore the first alignment layer 1180 and the third alignment layer 1360 may align the liquid crystal layer 1420. Additionally, since the liquid crystal layer 1440 is sandwiched between the second alignment layer 1280 and the fourth alignment layer 1380, and the alignment direction of the second alignment layer 1280 is parallel and opposite to the alignment direction of the fourth alignment layer 1380, therefore the second alignment layer 1280 and the fourth alignment layer 1380 may align the liquid crystal layer 1440.

According to the afore-described structure, by using the first active device 1140 on the first electrode device 1100, the liquid crystal layer 1420 sandwiched between the first electrode device 1100 and the third electrode device 1300 may control a voltage difference between the first electrode 1160 and the common electrode 1340, so that the liquid crystal layer 1420 generates a refractive index variation. Since the first electrode 1160 has the first opening 1162, an overall refractive index distribution of the liquid crystal layer 1420 disposed inside the first opening 1162 is varied. In other words, an electric field distribution formed between the first electrode device 1100 and the third electrode device 1300 progressively decreases, from an edge towards a center of the first opening 1162. Accordingly, the liquid crystal layer 1420 disposed inside the opening 1162 may form a refractive index distribution of a gradient-index lens (GRIN Lens), thereby achieving a focal length modulating function for focusing light similar to a convex lens. Moreover, this focusing effect may be controlled by a voltage magnitude of a driving signal of the first active device 1140.

Likewise, by using the second active device 1240 on the second electrode device 1200, the liquid crystal layer 1440 sandwiched between the second electrode device 1200 and the third electrode device 1300 may control a voltage difference between the second electrode 1260 and the common electrode 1340, so that the liquid crystal layer 1440 generates a refractive index variation. Since the second electrode 1260 has the second opening 1262 corresponding to the first opening 1162, an overall refractive index distribution of the liquid crystal layer 1440 disposed inside the second opening 1262 is varied. In other words, an electric field distribution formed between the second electrode device 1200 and the third electrode device 1300 progressively decreases, from an edge towards a center of the second opening 1262. Accordingly, the liquid crystal layer 1440 disposed inside the opening 1262 may form a refractive index distribution of a GRIN Lens, thereby achieving a focal length modulating function for focusing light similar to a convex lens. Moreover, this focusing effect may be controlled by a voltage magnitude of a driving signal of the second active device 1240.

In light of the foregoing, it should be noted that, liquid crystal molecules constitute a birefringent material in view of two different polarization directions of an incident beam with a predetermined incident direction. A refractive index thereof is represented as an extraordinary ray (E-ray) refractive index ($n_e$) and an ordinary ray (O-ray) refractive index ($n_o$). Therefore, when a typical liquid crystal lens is configured without a polarizer, the incident beam generates double focus points after passing through the liquid crystal lens. On the other hand, when a polarizer is included, a light intensity of the incident beam is weakened. Hence, by adopting the aforementioned structure, the double-layer liquid crystal lens apparatus 1000 according to the present embodiment may mitigate the issue of focus points while achieving a preferable optical focal length modulating quality.

In more specifics, when the incident beam passes through the liquid crystal layer 1420, the afore-described issue of double focus points occurs when a polarizer is not configured to polarize the incident beam. Accordingly, by configuring another liquid crystal lens structure (e.g., the liquid crystal lens structure formed by the aforementioned second and third electrode devices and the liquid crystal layer 1440), in which the alignment direction of the liquid crystal layer 1440 is dissimilar to the alignment direction of the liquid crystal layer 1420, the double-layer liquid crystal lens apparatus 1000 according to the present embodiment may compensate for the aforesaid double focus points issue through suitable voltage control. Thereby, the double-layer liquid crystal lens apparatus 1000 has a preferable optical focal length modulating quality.

Moreover, since the double-layer liquid crystal lens apparatus 1000 according to the present embodiment employs the active devices 1140 and 1240 to respectively control the electric potentials of the first electrode 1160 and the second electrode 1260, therefore, besides suitably shrinking an overall size of the double-layer liquid crystal lens apparatus 1000, a preferable electric characteristic is obtained, and further, due to a reduction of external ICs used, a cost-saving effect is achieved as well.

In view of the above description, according to an embodiment of the invention, the electric potentials of the first electrode 1160 and the second electrode 1260 are the same, whereas the electric potentials of the first electrode 1160 and the second electrode 1260 are different than the electric potential of the common electrode 1340. In an embodiment, the electric potentials of the first electrode 1160 and the second electrode 1260 are different, and the electric potentials of the first electrode 1160 and the second electrode 1260 are dissimilar to the electric potential of the common electrode 1340.

In the present embodiment, the double-layer liquid crystal lens apparatus 1000 further includes a plurality of sealants 1620 and 1640, as shown in FIG. 1. The sealants 1620 and 1640 are respectively disposed between the first electrode device 1100 and the third electrode device 1300, and between the second electrode device 1200 and the third electrode device 1300, so as to respectively maintain a first containing space L1 between the first electrode device 1100 and the third electrode device 1300, and maintain a second containing space L2 between the second electrode device 1200 and the third electrode device 1300. Moreover, the liquid crystal layers 1420 and 1440 are respectively disposed inside the first containing space L1 and the second containing space L2.

Typically speaking, an adhesive agent is disposed on the first electrode device 1100, the second electrode device 1200, or the third electrode device 1300. Furthermore, the first electrode device 1100, the second electrode device 1200, and the third electrode device 1300 are aligned and attached. When the adhesive agent is cured thereafter, the aforesaid sealants 1620 and 1640 are formed. In the present embodiment, the sealants 1620 and 1640 adopt, for example, a plastic framing technique of a liquid crystal display panel, or other suitable plastic framing techniques and materials, and embodiments of the invention are not limited thereto as the foregoing description is merely exemplary. In an embodiment of the invention, the sealants 1620 and 1640 may also be spacers.

It is worth mentioning that, as shown in FIG. 1, the present embodiment exemplarily disposes the first electrode 1160 and the first alignment layer 1180 on different sides of the first substrate 1120 to facilitate description. However, according to an embodiment not drawn herein, the first electrode 1160 and the first alignment layer 1180 may also be disposed on a same side of the first substrate 1120, that is, disposed on the second surface 1124 of the first substrate 1120. Moreover, the first electrode 1160 is disposed between the first alignment layer 1180 and the first substrate 1120. Accordingly, since a distance between the first electrode 1160 and the common electrode 1340 is reduced, correspondingly a voltage applied to the first electrode 1160 may be suitably lowered, thereby partially conserving electricity. Likewise, the second electrode 1260 and the second alignment layer 1280 may be disposed on a same side of the second substrate 1220.

Figure 3:
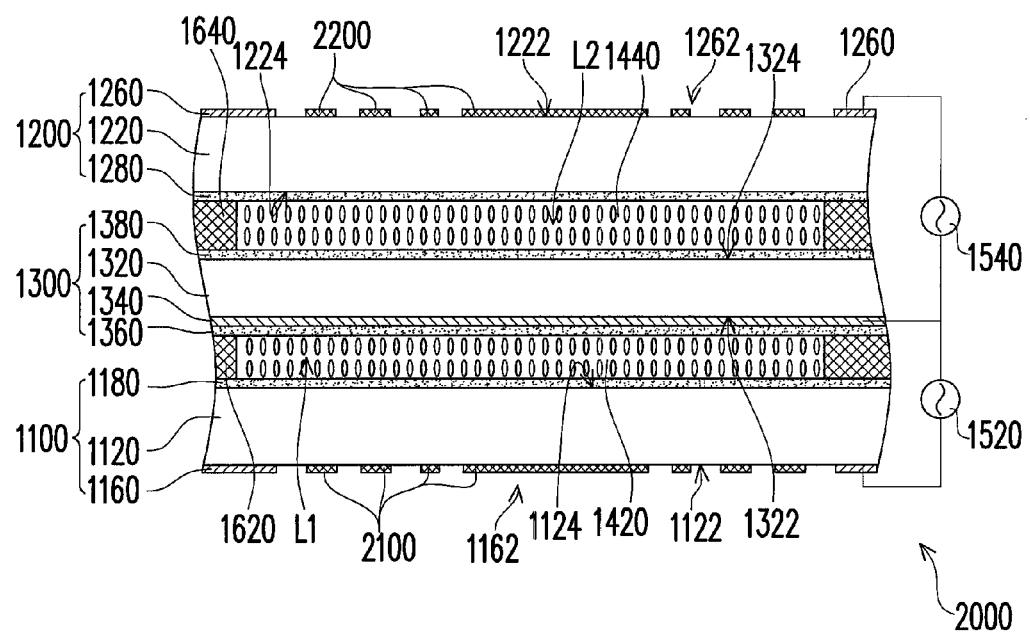
FIG. 3 is a schematic cross-sectional view illustrating a portion of a double-layer liquid crystal lens apparatus in accordance with another embodiment of the invention.
Figure 4A:
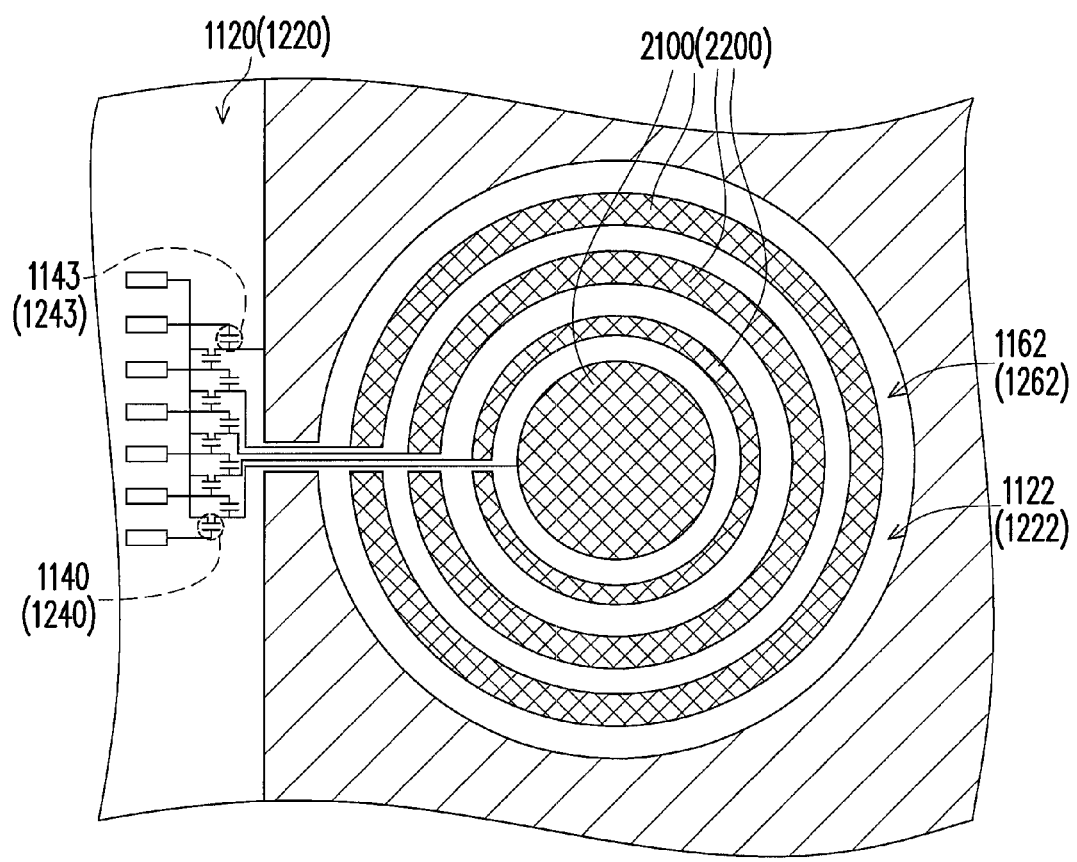
FIG. 4A is a schematic view illustrating a portion of a first active device, a first electrode, and a first ring-shaped electrode disposed on a first substrate, or a portion of a second active device, a second electrode, and a second ring-shaped electrode disposed on a second substrate depicted in FIG. 3.
Figure 4B:
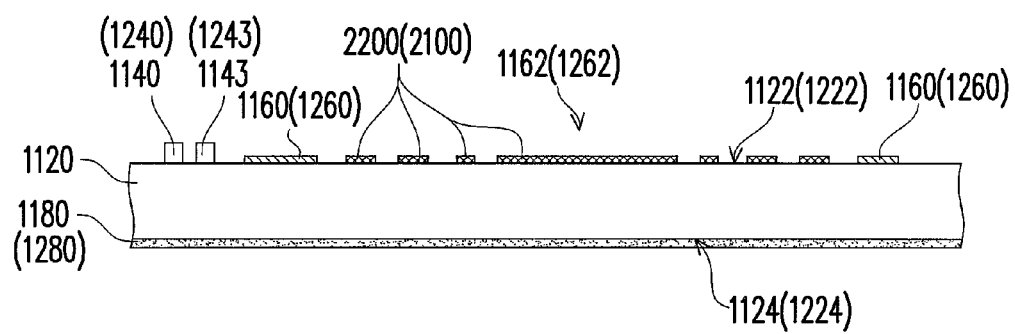
FIG. 4B is a schematic cross-sectional view illustrating a portion of a first electrode device or a second electrode device depicted in FIG. 3.

FIG. 3 is a schematic cross-sectional view illustrating a portion of a double-layer liquid crystal lens apparatus in accordance with another embodiment of the invention. FIG. 4A is a schematic view illustrating a portion of a first active device, a first electrode, and a first ring-shaped electrode disposed on a first substrate, or a portion of a second active device, a second electrode, and a second ring-shaped electrode disposed on a second substrate depicted in FIG. 3. FIG. 4B is a schematic cross-sectional view illustrating a portion of a first electrode device or a second electrode device depicted in FIG. 3. Referring concurrently to FIGS. 1, 2A-2D, 3, and 4A-4B, a double-layer liquid crystal lens apparatus 2000 is similar to the afore-described double-layer liquid crystal lens apparatus 1000, in which like components are labeled with the same reference numbers. A difference therebetween is that the double-layer liquid crystal lens apparatus 2000 has a plurality of the first active devices 1140, a plurality of the second active devices 1240, at least a first ring-shaped electrode 2100, and at least a second ring-shaped electrode 2200. A quantity of the first ring-shaped electrodes and the second ring-shaped electrodes according to the present embodiment is exemplarily set as four to facilitate description, although not limited thererto.

The first ring-shaped electrodes 2100 are disposed inside the first opening 1162 and configured on the first surface 1122 of the first substrate 1120. One of the first active devices 1140 is electrically connected to the first electrode 1160, while the rest of the first active devices 1140 are respectively electrically connected to the four first ring-shaped electrodes 2100. In the present embodiment, the drains 1148 of the first active devices 1140 are respectively electrically connected to the first electrode 1160 and the first ring-shaped electrodes 2100. Moreover, when the gate 1142 is driven, the source 1146 and the drain 1148 are electrically connected to each other through the active layer 1144. In other words, through the respective electrically connected first active devices 1140, the first electrode 1160 and the first ring-shaped electrodes 2100 may be driven or applied voltages.

Likewise, as shown in FIG. 4A, the second ring-shaped electrodes 2200 are disposed inside the second opening 1262 and configured on the first surface 1222 of the second substrate 1220. One of the second active devices 1240 is electrically connected to the second electrode 1260, while the rest of the second active devices 1240 are respectively electrically connected to the four second ring-shaped electrodes 2200. In the present embodiment, the drains 1248 of the second active devices 1240 are respectively electrically connected to the second electrode 1260 and the second ring-shaped electrodes 2200. Moreover, when the gate 1242 is driven, the source 1246 and the drain 1248 are electrically connected to each other through the active layer 1244. Accordingly, through the respective electrically connected second active devices 1240, the second electrode 1260 and the second ring-shaped electrodes 2200 may be driven or applied voltages.

In the present embodiment, as shown in FIG. 4A, the first ring-shaped electrodes 2100 disposed inside the first opening 1162 are arranged as concentric circles, and the second ring-shaped electrodes 2200 disposed inside the second opening 1262 are arranged as concentric circles. Additionally, as each of the ring-shaped electrodes 2100 or 2200 adopts a TFT voltage control mechanism in conjunction with the structure of the common electrode 1340 on the third electrode device 1300, a structure resembling a parallel plate capacitor may be formed. Therefore, by applying different voltages on each of the ring-shaped electrodes 2100 or 2200, the light focusing property of the double-layer liquid crystal lens apparatus 2000 may be modulated.

For example, for a typical positive uniaxial liquid crystal ($n_e > n_o$), when a lower potential is applied to the ring-shaped electrodes near an inner ring, and a higher potential is applied to the ring-shaped electrodes near an outer ring, then a phase delay quantity of the liquid crystal layers 1420 and 1440 near the inner ring would be higher than a phase delay quantity of the liquid crystal layers 1420 and 1440 near the outer ring. Therefore, the entire liquid crystal lens achieves an optical effect of a positive lens. Conversely, when a higher potential is applied to the ring-shaped electrodes near the inner ring, and a lower potential is applied to the ring-shaped electrodes near the outer ring, then the phase delay quantity of the liquid crystal layers 1420 and 1440 near the inner ring would be lower than the phase delay quantity of the liquid crystal layers 1420 and 1440 near the outer ring. Therefore, the entire liquid crystal lens achieves an optical effect of a negative lens. In other words, by the afore-described design of voltage application, the double-layer liquid crystal lens apparatus 2000 may operate with different focusing modes such as a none-focusing characteristic (e.g., equal voltages at outer ring and inner ring), a positive lens focusing characteristic (e.g., outer ring voltage higher than inner ring voltage), and a negative lens focusing characteristic (e.g., outer ring voltage lower than inner ring voltage). Thereby, the double-layer liquid crystal lens apparatus 2000 achieves one of its main capabilities.

In light of the foregoing description, according to a driving power source quantity and a user design and demand adopted by the double-layer liquid crystal lens apparatuses 1000 or 2000, at least a portion of the electric potentials of the first electrode 1160 and the first ring-shaped electrodes 2100 is the same. Alternatively, the electric potentials of the first electrode 1160 and the first ring-shaped electrodes 2100 are different. Likewise, at least a portion of the electric potentials of the second electrode 1260 and the second ring-shaped electrodes 2200 is the same. Alternatively, the electric potentials of the second electrode 1260 and the second ring-shaped electrodes 2200 are different.

The double-layer liquid crystal lens apparatuses 2000 and 1000 differ only in that the double-layer liquid crystal lens apparatus 2000 respectively disposes at least a first ring-shaped electrode and at least a second ring-shaped electrode inside the first opening 1162 and the second opening 1262. Therefore, besides having the aforementioned advantages, the double-layer liquid crystal lens apparatus 2000 also has the advantages of the double-layer liquid crystal lens apparatus 1000, and further description thereof is omitted hereafter.

It should be noted that, the embodiments depicted in FIGS. 1 and 3 operate by respectively using different driving power sources for the first electrode device 1100, the second electrode device 1200, and the third electrode device 1300. However, in other embodiments of the invention, a same driving power source may be shared. Moreover, the aforementioned first substrate 1120, second substrate 1220, and the third substrate 1320 are transparent substrates, for example.

In light of the foregoing, the double-layer liquid crystal lens apparatus according to embodiments of the invention at least includes the following advantages. First, through the double-layer liquid crystal lens structure formed by the first electrode device, the second electrode device, and the third electrode device, and by suitably controlling the voltages applied on the liquid crystal lens, the refractive index distribution of the GRIN lens can be generated. Moreover, the light passing through is compensated so that the double-layer liquid crystal lens apparatus has a preferable focus modulating capability, and the double focus points condition does not occur easily. Accordingly, the double-layer liquid crystal lens apparatus may have a focal length modulating function focusing/diverging the light, similar to a convex lens or a concave lens. Furthermore, since the double-layer liquid crystal lens apparatus controls the refractive index of the double-layer liquid crystal lens by using active devices (e.g., TFTs), thus in addition to effectively reducing the overall size of the double-layer liquid crystal lens apparatus, the use of external ICs is reduced, thereby lowering the fabrication cost and simplifying the structure. Moreover, because the double-layer liquid crystal lens apparatus has a plurality of ring-shaped electrodes disposed inside openings, hence, by gradually adjusting the voltages applied to each of the ring-shaped electrodes, the double-layer liquid crystal lens apparatus may achieve a preferable optical performance.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A double-layer liquid crystal lens apparatus, comprising:
a first electrode device comprising a first substrate, at least a first active device, a first electrode, and a first alignment layer, the first active device, the first electrode, and the first alignment layer are disposed on the first substrate, the first active device is electrically connected to the first electrode, and the first electrode has a first opening;
a second electrode device comprising a second substrate, at least a second active device, a second electrode, and a second alignment layer, the second active device, the second electrode, and the second alignment layer are disposed on the second substrate, the second active device is electrically connected to the second electrode, and the second electrode has a second opening corresponding to the first opening;
a third electrode device disposed between the first electrode device and the second electrode device, the third electrode device comprising a third substrate, a common electrode, a third alignment layer, and a fourth alignment layer, the common electrode, the third alignment layer, and the fourth alignment layer are disposed on the third substrate, the third alignment layer and the fourth alignment layer are respectively disposed on different sides of the third substrate, and the common electrode is disposed between the third alignment layer and the third substrate; and
two liquid crystal layers respectively disposed between the first electrode device and the third electrode device and between the second electrode device and the third electrode device, the first alignment layer and the third alignment layer aligning one of the liquid crystal layers, and the second alignment layer and the fourth alignment layer aligning another one of the liquid crystal layers.

2. The double-layer liquid crystal lens apparatus as claimed as in claim 1, wherein the first active device comprises a gate, an active layer, a source, and a drain, the drain is electrically connected to the first electrode, and when the gate is driven, the source and the drain are electrically connected to each other through the active layer.

3. The double-layer liquid crystal lens apparatus as claimed as in claim 1, wherein the second active device comprises a gate, an active layer, a source, and a drain, the drain is electrically connected to the second electrode, and when the gate is driven, the source and the drain are electrically connected to each other through the active layer.

4. The double-layer liquid crystal lens apparatus as claimed as in claim 1, wherein an electric potential of the first electrode and an electric potential of the second electrode are the same, and the electric potentials of the first electrode and the second electrode are different from an electric potential of the common electrode.

5. The double-layer liquid crystal lens apparatus as claimed as in claim 1, wherein an electric potential of the first electrode is different from an electric potential of the second electrode, and the electric potentials of the first electrode and the second electrode are different from the electric potential of the common electrode.

6. The double-layer liquid crystal lens apparatus as claimed as in claim 1, wherein when the at least a first active device and the at least a second active device are respectively a plurality of first active devices and a plurality of second active devices, the double-layer liquid crystal lens apparatus further comprises at least a first ring-shaped electrode and at least a second ring-shaped electrode, the first ring-shaped electrode is disposed inside the first opening, the first active devices are respectively electrically connected to the first electrode and the first ring-shaped electrode, the second ring-shaped electrode is disposed inside the second opening, and the second active devices are respectively electrically connected to the second electrode and the second ring-shaped electrode.

7. The double-layer liquid crystal lens apparatus as claimed as in claim 6, wherein each of the first active devices comprises a gate, an active layer, a source, and a drain, the drain of each of the first active devices is respectively electrically connected to the first electrode and the first ring-shaped electrode, and when the gate is driven, the source and the drain are electrically connected to each other through the active layer.

8. The double-layer liquid crystal lens apparatus as claimed as in claim 6, wherein each of the second active devices comprises a gate, an active layer, a source, and a drain, the drain of each of the second active devices is respectively electrically connected to the second electrode and the second ring-shaped electrode, and when the gate is driven, the source and the drain are electrically connected to each other through the active layer.

9. The double-layer liquid crystal lens apparatus as claimed as in claim 6, wherein the at least a first ring-shaped electrode disposed inside the first opening is arranged as concentric circles, and the at least a second ring-shaped electrode disposed inside the second opening is arranged as concentric circles.

10. The double-layer liquid crystal lens apparatus as claimed as in claim 6, wherein at least a portion of the electric potentials of the first electrode and the at least a first ring-shaped electrode is the same.

11. The double-layer liquid crystal lens apparatus as claimed as in claim 6, wherein the electric potentials of the first electrode and the at least a first ring-shaped electrode are different.

12. The double-layer liquid crystal lens apparatus as claimed as in claim 6, wherein at least a portion of the electric potentials of the second electrode and the at least a second ring-shaped electrode is the same.

13. The double-layer liquid crystal lens apparatus as claimed as in claim 6, wherein the electric potentials of the second electrode and the at least a second ring-shaped electrode are different.

14. The double-layer liquid crystal lens apparatus as claimed as in claim 1, wherein an alignment direction of the first alignment layer is parallel and opposite to an alignment direction of the third alignment layer, an alignment direction of the second alignment layer is parallel and opposite to an alignment direction of the fourth alignment layer, and the alignment direction of the first alignment layer is perpendicular to the alignment direction of the second alignment layer.

15. The double-layer liquid crystal lens apparatus as claimed in claim 1, wherein the first electrode is disposed on a side of the first substrate, and the first alignment layer is disposed on another side of the first substrate.

16. The double-layer liquid crystal lens apparatus as claimed in claim 1, wherein the first electrode and the first alignment layer are disposed on a same side of the first substrate, and the first electrode is disposed between the first alignment layer and the first substrate.

17. The double-layer liquid crystal lens apparatus as claimed in claim 1, wherein the second electrode is disposed on a side of the second substrate, and the second alignment layer is disposed on another side of the second substrate.

18. The double-layer liquid crystal lens apparatus as claimed in claim 1, wherein the second electrode and the second alignment layer are disposed on a same side of the second substrate, and the second electrode is disposed between the second alignment layer and the second substrate.

19. The double-layer liquid crystal lens apparatus as claimed in claim 1, wherein the first electrode device, the second electrode device, and the third electrode device share a same driving power source or respectively employs a different driving power source.

20. The double-layer liquid crystal lens apparatus as claimed in claim 1, further comprising a plurality of sealants respectively disposed between the first electrode device and the third electrode device, and between the second electrode device and the third electrode device, so as to respectively maintain a first containing space between the first electrode device and the third electrode device, and maintain a second containing space between the second electrode device and the third electrode device, wherein the liquid crystal layers are respectively disposed inside the first containing space and the second containing space.

* * * * *